Apr. 17, 1923.

V. CALABRESE

CAMERA

Filed March 9, 1920

WITNESSES
H. Harwood
P. H. Pattison.

INVENTOR
Vincent Calabrese.
BY
Mundler
ATTORNEYS

Apr. 17, 1923.

V. CALABRESE

CAMERA

Filed March 9, 1920  2 Sheets-Sheet 2

1,452,413

WITNESSES

INVENTOR
Vincent Calabrese.
BY
ATTORNEYS

Patented Apr. 17, 1923.

1,452,413

UNITED STATES PATENT OFFICE.

VINCENT CALABRESE, OF BROOKLYN, NEW YORK.

CAMERA.

Application filed March 9, 1920. Serial No. 364,362.

*To all whom it may concern:*

Be it known that I, VINCENT CALABRESE, a citizen of the United States, and a resident of the city of New York, borough of Brooklyn, in the county of Kings and State of New York, have invented a new and Improved Camera, of which the following is a full, clear, and exact description.

The present invention relates to new and useful improvements in cameras, and it pertains more particularly to the film-winding mechanism thereof.

It is one of the primary objects of the present invention to provide a film-winding mechanism which is so constructed that when desired the film spool may be operated to position an unexposed section of the film strip behind the shutter-opening after the operation of the shutter.

It is a further object of the present invention to provide means whereby an automatic winding of the film to properly position the various sections thereof behind the shutter opening, is obtained.

It is a still further object of the invention to so construct the device that the paper strip on which the film is carried will be wound upon the winding spool both before the first exposure and after the last exposure in order that the spool may be removed from the camera without injury or danger of exposure of any section of the film strip.

With the above and other objects in view, reference is had to the accompanying drawings, in which—

Figure 1:
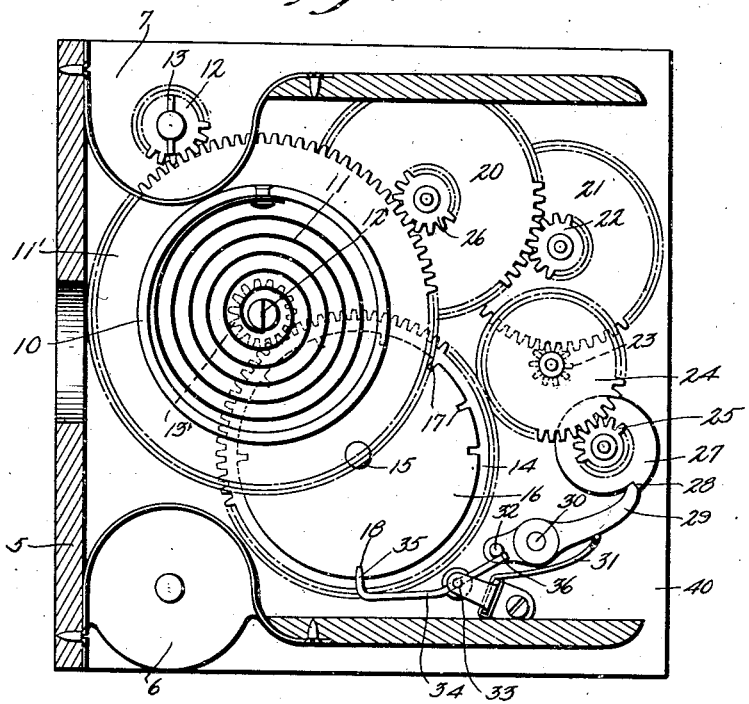
Figure 1 is a transverse sectional view of a camera constructed in accordance with the present invention.

Referring more particularly to the drawings, the reference character 5 designates a camera which may be of any suitable form so long as it is of the film type. The reference character 6 designates the spool carrier for a spool of unexposed film, while the reference character 7 designates the carrier for the spool on which the exposed film is wound.

The reference character 10 designates a spring barrel, and formed integral with said spring barrel or secured thereto in any suitable manner to be driven thereby, is a gear wheel 11'. This gear wheel 11' is adapted to mesh on one side with a small gear wheel 12, which gear wheel is provided with a flange or lug 13 adapted to be received within the slot in the end of a film spool, which latter construction, however, is not shown in the present case, since it forms no part of the present invention.

Mounted within the spring barrel is a coil spring 11 and the inner end of said coil spring 11 is secured, as at 12', to a lug 13' projecting from the gear wheel 11'. The gear wheel 13' fixed to gear wheel 11' meshes with a gear wheel 14 mounted, as at 15, and carried by the gear wheel 14 is a notched disk 16. This disk 16 is provided with a plurality of peripheral notches 17. There are seven of these notches 17 grouped together and arranged in relatively close relation, while intermediate of the end notches of the group, is a notch 18, the purpose of which will be hereinafter described.

The reference characters 20, 21, 22, 23, 24, and 25 represent the several gears of a gear train, and these gears are operated by means of their engagement with one another and the gear wheel 26 which is adapted to mesh with the gear 11'. Secured to the gear 25, is a stopping mechanism 27, and this stopping mechanism 27 consists of a disk, on the peripheral edge of which is provided a shoulder 28. This shoulder 28 is adapted to be engaged by means of a pawl 29. pivoted intermediate its ends as at 30, and maintained in engagement with the peripheral edge of the disk by means of a spring 31. This pawl is provided on one of its ends with a projection 32, said projection being carried by the end opposite to that which engages the shoulder 28, to control the movement of the train of gears heretofore mentioned.

Figure 2:
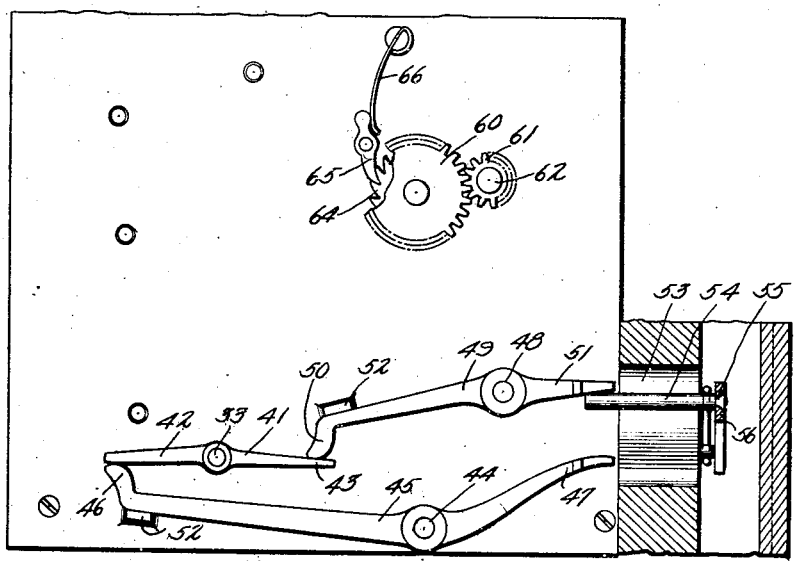
Fig. 2 is a sectional view taken on the line 2—2 of Fig. 3.
Figure 3:
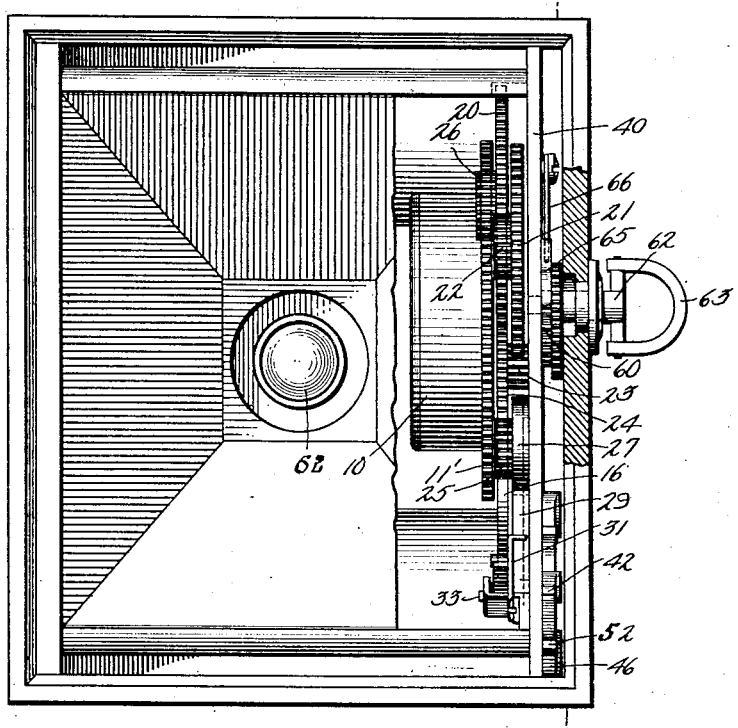
Fig. 3 is a rear end elevation partly in section and partly broken away.

Pivotally mounted as at 33, is a latch 34, and one end of this latch is provided with a right-angular extension 35 adapted to engage the notches of the notched disk 16. The opposite end of this latch 34 is adapted to engage the projection 32 of the pawl 29, as indicated by the reference character 36. The pivot 33 of the latch 34 extends through the plate 40, on which the foregoing mechanism is mounted, and upon the opposite side of the plate, the pivot point of said latch is provided with a lever 41. This pivot 33 of the latch 34 is rigidly secured to the lever intermediate of its ends in such a manner that projecting in opposite directions from the pivot point 33 are arms 42 and 43. Pivotally mounted, as at 44, is a lever 45, the pivotal mounting 44 being between the ends of the lever. One of the ends of the lever 45 is formed with a right-angular extension 46, and said right-angular extension 46 is adapted to engage the arm 42 of the lever 41, as shown in Fig. 2 of the drawings. The opposite end 47 of the lever 45 is curved for a purpose to be hereinafter described.

Pivoted as at 48, is a lever 49, and said lever 49 has a right-angular end 50 adapted to engage the arm 43 of the lever 41. The opposite end 51 of this lever 49 is adapted to occupy a position in which it is parallel with the lever 47, and is spaced with relation thereto. Each of these levers 45 and 49 is limited in its movement in one direction by means of a suitable stop 52.

Figure 4:
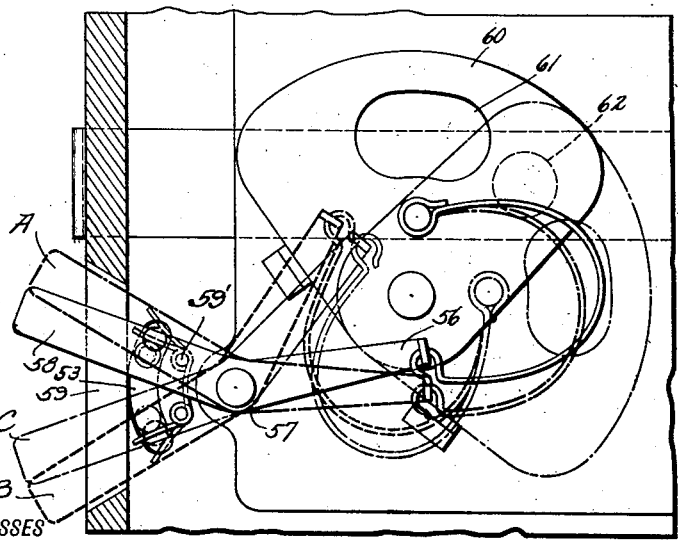
Fig. 4 is a view of the shutter mechanism showing in dotted lines, the several positions of its mechanism during the different steps in the operation thereof.

Projecting through an opening 53 in one of the walls of the camera, is a rigid member 54 and said member is rigidly secured as at 55, to the shutter-operating lever 56. This shutter-operating lever 56 is pivotally mounted as at 57, and has its operating end 58 projected beyond one wall of the camera through an opening 59 formed therein. A spring 59' is employed to return the lever 58 to normal position after each operation thereof. The shutter is designated by the reference character 60, and said shutter is provided with an exposure opening 61 adapted to move by the lens 62 in order to permit of a projection of the light therethrough. As shown in Fig. 4, the heavy dot-and-dash line A and the heavy dotted line B, this shutter-operating lever 56 is capable of a movement beyond the point necessary to operate the shutter, the movement necessary to operate the shutter being indicated by the full-line position of the lever and the light dot-and-dash line C in said figure. As this shutter-operating lever is moved from the position shown in full lines to the position designated by the reference character A, the rigid member 54 will engage the lever 51, and when said shutter-operating lever 56 is moved from the position C to the position B, said rigid member 54 will engage the end 47 of the pivoted lever 45.

Secured to the opposite side of the plate 40 to that on which the train of gearing is secured, is a gear wheel 60, and meshing with said gear wheel 60, is a gear wheel 61. This gear wheel 61 is rigidly carried by a shaft 62 which projects through one of the walls of the camera, and is provided with a winding key 63. Carried by the rear face of the gear wheel 60, is a circular rack 64, and meshing therewith to prevent reverse movement of the gear wheel 60, is a pawl 65, which is maintained in engagement with the teeth of the circular rack 64, by means of a spring 66.

The device operates in the following manner:

Assuming that a new roll of film has been placed in the carrier 6 and the free end of its black paper strip is secured to the spool carried by the carrier 7, and the shutter-operating lever 58 is in the position shown in full lines in Fig. 4, this shutter-operating lever 58 will be moved to the position shown in heavy dot-and-dash lines and indicated by the reference character A in Fig. 4, and this action will move the rigid member 54 into engagement with the end 51 of the pivoted lever 49 and rock said lever about its pivot. The lever in rocking about its pivot will engage the arm 43 of the lever 41, and rock said lever about its pivotal point 33. This rocking of the shaft 33 by the lever 41, lifts the pawl 29 out of engagement with the shoulder 28 of the cam 27, and permits of an operation of the train of gears, the coil 11 acting as the motive force.

Simultaneously with the movement of the pawl 29 out of engagement with the shoulder 28, the dog 34 is disengaged from the recess 18 and the notched disk 16 rotates. Upon rotation of the notched disk 16, the end 35 of the dog 34 engages in the next notch and this engagement of the right-angular end 35 of the dog 34 with this notch permits of the pawl 29 moving to a position where it will be engaged by the shoulder 28 of the cam 27. This movement of the notched disk will wind enough of the black paper strip to position the first film opposite the shutter opening of the camera.

Assuming now that the shutter is operated by movement of the lever 58 to the position C in Fig. 4, to make an exposure: From the position C, the operating lever 58 is moved to the position B in Fig. 4, and in its movement the rigid member 54 engages the end 47 of the pivoted lever 45 and rocks the lever 41 by reason of the engagement of the end 46 with the arm 42 of the lever 41 to repeat the operation.

The herein described operation is carried out with each exposure except where it may be desired to take time exposures, which operation requires a double operation of the shutter-operating mechanism, and to accomplish this, the operator is careful not to move the shutter-operating mechanism beyond the full-line position shown in Fig. 4, when moving the same upwardly or beyond the position indicated by the reference character C when moved downwardly until after the second operation of the shutter.

From the foregoing it will be seen that the present invention provides a mechanically-operated mechanism for winding the film spool in a camera, and that the same is dependent upon the shutter-operating mechanism for its operation and is automatically operated thereby.

Furthermore, in the present construction, provision is made whereby the film-winding mechanism is not operated with each operation of the shutter-operating lever, but said shutter-operating lever may be operated independently of the winding mechanism, if desired. By such a construction, it will be readily apparent that with a camera so equipped, a plurality of pictures of moving objects may be taken in sequence, and dependent upon the speed at which the train of gearing drives the film-winding spool, these exposures in sequence may be made at varying intervals.

What is claimed is:

1. In combination with a camera, its shutter operating mechanism, and film winding mechanism, automatic means for operating the film winding mechanism upon excessive operation of the shutter operating mechanism.

2. In combination with the shutter actuating mechanism and film winding mechanism of a camera, mechanically operated means for operating said film winding mechanism and including an actuating lever movable alternately in opposite directions for actuating the shutter mechanism, and means cooperative between the lever and winding mechanism to release the winding mechanism upon movement of the lever in either direction.

3. In combination with a camera, a shutter operating mechanism therefor, and film winding mechanism, a spring motor for actuating the film winding mechanism and means for releasing said spring motor upon actuation of the shutter actuating mechanism, said shutter actuating mechanism including a lever movable alternately in opposite directions, and operative connections between the lever and film winding mechanism to release the latter upon excessive movement of the lever in either direction.

4. In combination with a camera, a shutter actuating mechanism and its film winding mechanism, said shutter being of the type movable alternately in opposite directions by means of a lever, means for mechanically operating the film winding mechanism, said film winding means being controlled by the shutter actuating mechanism and released upon excessive movement of the lever to thereafter catch when the film has been moved.

5. In combination with a camera, a film winding mechanism and its shutter actuating mechanism, the shutter being of the type provided with an actuating lever movable alternately in opposite directions and capable of excessive movement in either direction, means for operating the film winding mechanism, releasing means for the film winding mechanism, and means operatively connecting the lever and the releasing means to actuate the latter upon excessive movement of the lever after operating the shutter in either direction to permit the film to move, said releasing means being thereafter active to check the movement of the film.

6. In combination with a camera and a motor for winding up the film thereof, a releasing mechanism for said motor, said releasing mechanism comprising a latch adapted to engage one of the rotary members of said motor to limit the movement thereof, a lever secured to one end of the latch, a pair of parallel pivoted levers adapted to engage the latch lever upon opposite sides of its pivotal point, the shutter of the camera being actuated in opposite directions, and means operated by excessive movement of the shutter actuating mechanism in either direction for alternately engaging said pivoted levers to rock the latch lever about its pivotal point to release the motor.

VINCENT CALABRESE.